US009354361B2

(12) United States Patent
Wang

(10) Patent No.: US 9,354,361 B2
(45) Date of Patent: May 31, 2016

(54) SPLICING-SCREEN BORDER WEAKENING STRUCTURE AND SPLICING SCREEN

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD.

( * ) Notice: Subject to any disclaimer, the term of this patent is extended or adjusted under 35 U.S.C. 154(b) by 10 days.

(21) Appl. No.: 14/525,767

(22) Filed: Oct. 28, 2014

(65) Prior Publication Data

US 2015/0362638 A1 Dec. 17, 2015

(30) Foreign Application Priority Data

Jun. 13, 2014 (CN) .......................... 2014 1 0265158

(51) Int. Cl.
*G02B 5/04* (2006.01)
*G02F 1/1333* (2006.01)
*G02F 1/1335* (2006.01)

(52) U.S. Cl.
CPC ............... *G02B 5/04* (2013.01); *G02F 1/1335* (2013.01); *G02F 1/13336* (2013.01); *G02F 2001/13356* (2013.01)

(58) Field of Classification Search
CPC ........ G02B 5/04; G02B 7/1805; G02B 5/045; G02B 27/0972; G02B 27/09
USPC ......... 359/831, 833, 834, 836, 837, 615, 608, 359/737; 356/51
See application file for complete search history.

(56) References Cited

U.S. PATENT DOCUMENTS

| 2004/0080938 A1* | 4/2004 | Holman | F21S 8/08 362/231 |
| 2004/0218390 A1* | 11/2004 | Holman | G02B 5/045 362/245 |
| 2006/0007369 A1 | 1/2006 | Jin et al. | |
| 2014/0009838 A1* | 1/2014 | Weber | G02B 3/08 359/615 |
| 2015/0116852 A1* | 4/2015 | Kim | G02B 17/002 359/834 |

FOREIGN PATENT DOCUMENTS

| CN | 1769971 A | 5/2006 |
| CN | 201107507 Y | 8/2008 |
| CN | 201181385 Y | 1/2009 |
| EP | 2 312 378 A1 | 4/2011 |

OTHER PUBLICATIONS

Office Action in Chinese Patent Application No. 201410265158.1, dated Mar. 23, 2016.

* cited by examiner

*Primary Examiner* — Jennifer L. Doak
(74) *Attorney, Agent, or Firm* — Baker Hostetler LLC

(57) ABSTRACT

A splicing-screen border weakening structure includes a transparent solid element through which a light ray is able to penetrate. The transparent solid element includes a fixing surface which is used for fixing to the border and a light-ray exiting surface which is opposite to the fixing surface, and further includes an inner area which is opposite to the border and an outer area which is opposite to an edge display area of the display screen. A first prism structure is at least arranged at a position corresponding to the inner area of the light-ray exiting surface. A light ray exits from the edge display area and enters into the outer area of the transparent solid element, and a part of the light ray is deflected by the first prism structure of the light-ray exiting surface and exits from an inner area of the light-ray exiting surface.

10 Claims, 2 Drawing Sheets

SPLICING-SCREEN BORDER WEAKENING STRUCTURE AND SPLICING SCREEN

CROSS-REFERENCE TO RELATED APPLICATION

The present application claims a priority of the Chinese patent application No. 201410265158.1 filed on Jun. 13, 2014, which is incorporated herein by reference in its entirety.

TECHNICAL FIELD

The present invention relates to the field of displaying technology, in particular to a splicing-screen border weakening structure and a splicing screen.

BACKGROUND

With the rapid development of LCD (Liquid Crystal Display) panels, LCD display with its ultra-thin, light weight, no radiation, stable performance, and many other advantages gradually become the mainstream display technology. Since an area of a single LCD screen is limited, it is well known that a display area is increased by a projection or splicing screens so as to obtain a large area display. The projection has disadvantages such as a projection brightness is limited, and the resolution is limited. It is difficult to stably continuously provide the large area display for a long time. Therefore, small size display screens are spliced to increase a display area, so that the large area display can be stably continuously achieved for a long time.

However, a border is necessary to install and protect a display area of a LCD display. When display screens are spliced, a border that cannot display images is positioned between the display screens. The border divides the image of a splicing screen, breaks the continuity and integrity of the image, and affects visual effects of the splicing screen. Therefore, it is an urgent matter to be solved to cancel this border effects. In the prior art, a width of the border is reduced to weaken the border, but still it cannot achieve a no-border effect.

At present, other ways are used to weaken the border. Such as a transparent plate is arranged on a surface of each display screen, and every edge of a periphery of the transparent plate is chamfered. Therefore, edges of two transparent plates form a V-shape groove at a position corresponding to the border. A light ray of an edge portion of the display area of the display screen is deflected via the V-shape groove, and exits from a position corresponding to the V-shape groove, so as to weaken the border. However, even though the transparent plate may weaken the border, there are still matters: the transparent plate increases a thickness of the splicing screen, and the V-shape groove is necessary to have a depth to weaken the border; the transparent plate covers the entire of the display screen, and a cost is increased; a visual angle of the light ray deflected by the V-shape groove is relatively small, and the visual effects is still affected by the border at different visual angles.

SUMMARY

It is an object of the present invention to provide a splicing-screen border weakening structure and a splicing screen, which have a simple configuration and can weaken or cancel an effect of a splicing-screen border.

The present invention provides a technical solution as following: splicing-screen border weakening structure arranged at a border between two display screens which are adjacent to each other, the display screen including a center display area, an edge display area, and a border area; the splicing-screen border weakening structure comprising: a transparent solid element through which a light ray is able to penetrate, the transparent solid element including a fixing surface which is used for fixing to the border and a light-ray exiting surface which is opposite to the fixing surface, the transparent solid element further including an inner area which is opposite to the border and an outer area which is opposite to the edge display area of the display screen, wherein, a first prism structure is at least arranged at a position corresponding to the inner area of the light-ray exiting surface, a light ray exits from the edge display area of the display screen and enters into the outer area of the transparent solid element, and a part of the light ray is deflected by the first prism structure of the light-ray exiting surface of the transparent solid element and exits from the inner area of the light-ray exiting surface.

Further, the first prism structure may include a plurality of first grooves.

Further, each of the first grooves may include at least one side surface having a curved-surface structure.

Further, the first grooves may include a center groove, and outer grooves which are symmetrically arranged with respect to the center groove, the center groove has two side surfaces which are symmetrically arranged with respect to a center line of the center groove, and the side surfaces are curved surfaces, each outer groove has a first side surface which is flat surface and a second side surface which is farther from the center groove than the first side surface and is a curved surface.

Further, the transparent solid element may further include side walls formed between the fixing surface and the light-ray exiting surface, and a second prism structure may be formed on the side walls to prevent the light ray from generating a total reflection on the side walls.

Further, the second prism structure may include a plurality of second grooves which are repeatedly arranged, each of the second grooves may include a first groove surface which is close to the light-ray exiting surface and a second groove surface which is close to the fixing surface, and the first groove surface has a flat shape and is parallel to a display surface of the display screen.

Further, the second groove surface may have a flat shape, and an angle between the first groove surface and the second groove surface may be 45 degrees.

Further, a supporting structure that is transparent may be arranged at an edge position of the outer area of the fixing surface.

Further, the transparent solid element may be a one-piece-structure made of a resin having a high transmission rate or made of an optical glass.

A splicing screen, characterized in that the splicing screen includes the abovementioned splicing-screen border weakening structure.

Effects of the present invention are as following:

The splicing-screen border weakening structure of the present invention has a simple configuration. The transparent solid element is only arranged at a position corresponding to the border of the splicing screen, and the first prism structure is arranged on the light-ray exiting surface of the transparent solid element. Therefore, the light ray exiting from the edge display area of the display screen is deflected by the first prism structure, such that a canceled or weakened effect of the border is achieved.

In the above configuration, since the first prism structure has a plurality of first grooves. In other words, the first prism structure includes a plurality of light-ray deflecting surfaces.

Therefore, a depth of each groove of the first prism structure can be smaller, and a thickness of the transparent solid element can be smaller. Further, the first prism structure deflects the light ray and exits the light ray at different visual angles. Therefore, a weakened effect of the splicing-screen border can be achieved at different visual angles. Furthermore, the transparent solid element is not necessary to cover the entire of the display screen, and is only arranged at a position corresponding to the border. Therefore, a cost is reduced.

DETAILED DESCRIPTION

Referring to drawings, the following principles and features of the present invention will be described. The following embodiment only explains the present invention and is not intended to limit the scope of the present invention.

Regarding to a matter of the prior art that a splicing-screen border may affect a splicing effect, the present invention provides a splicing-screen border weakening structure which is able to weaken or even cancel the effect of the splicing-screen border.

The splicing-screen border weakening structure of an embodiment of the present invention is arranged at a border between two display screens which are adjacent to each other. Each display screen includes a center display area, an edge display area, and a border area. The center display area is the center part of the display area which is able to display images. An edge display area is the edge part of the display area. The border area is the area in which the border is arranged, the border area is not able to display images.

Figure 1:
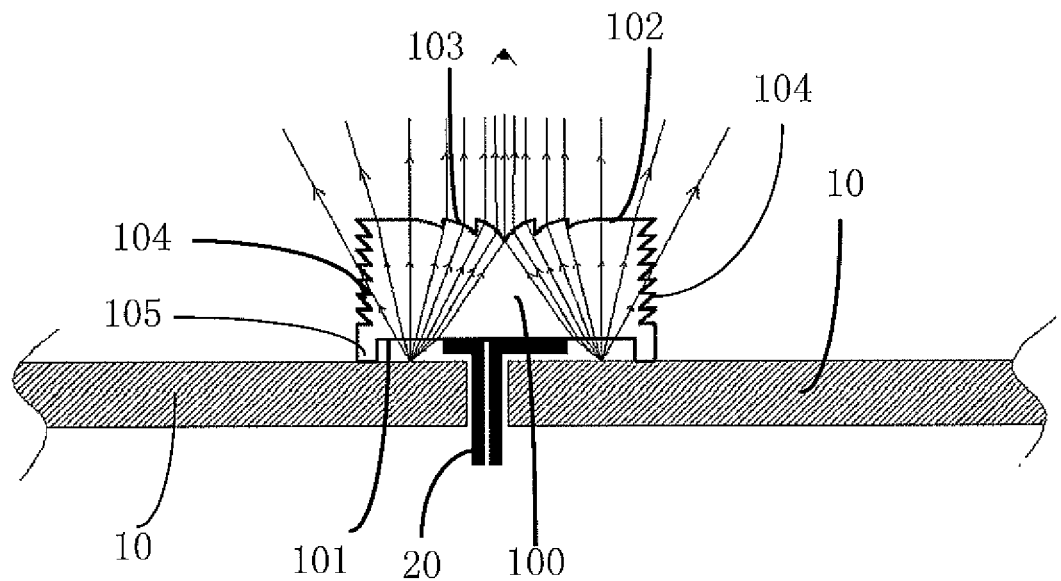
FIG. 1 is a schematic diagram showing a splicing-screen border weakening structure applied to a splicing screen, according to an embodiment of the present invention.
Figure 2:
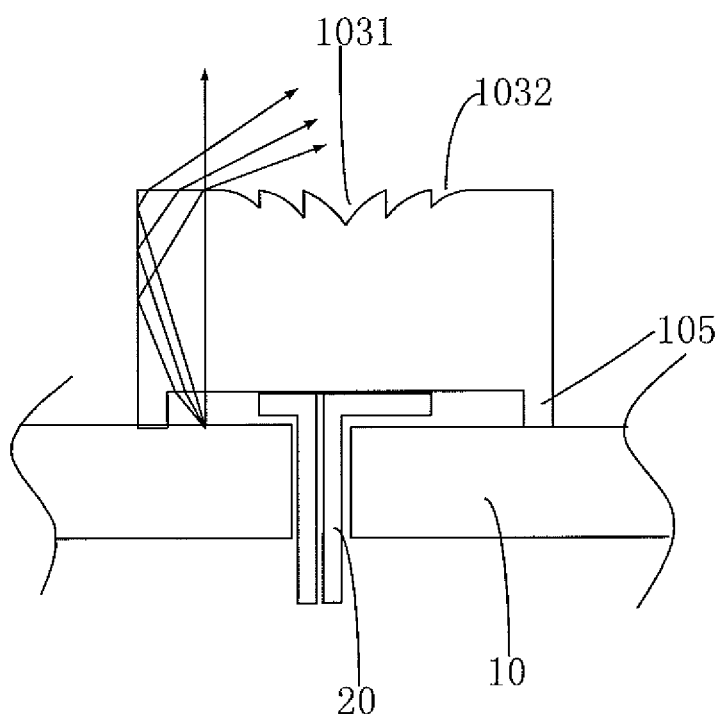
FIG. 2 is a schematic diagram showing a light-ray propagation in a case where a side wall of the splicing-screen border weakening structure is a vertical side wall, according to an embodiment of the present invention.
Figure 3:
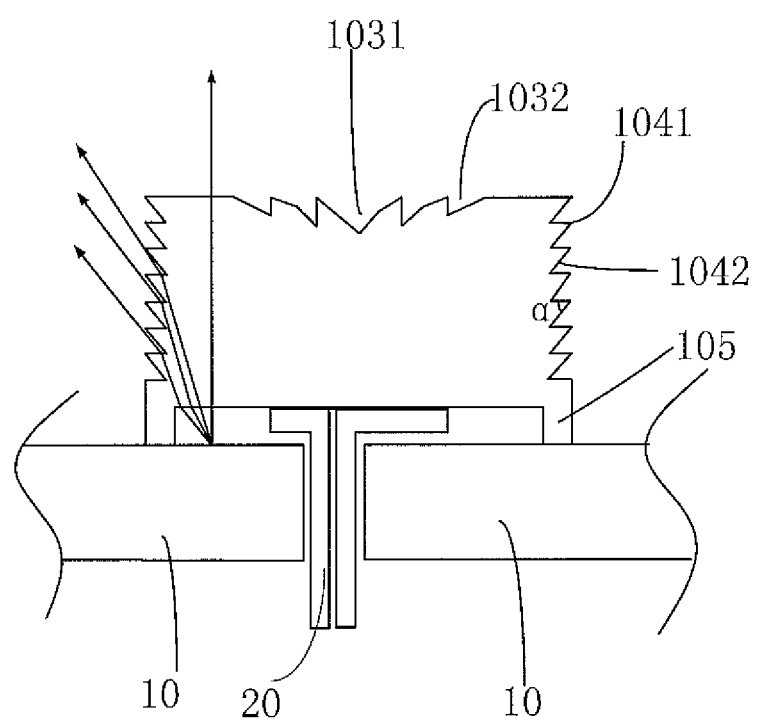
FIG. 3 is a schematic diagram showing a light-ray propagation in a case where the side wall of the splicing-screen border weakening structure has a second prism structure, according to an embodiment of the present invention.

As shown in FIGS. 1 to 3, the splicing-screen border weakening structure of the embodiment of the present invention includes a transparent solid element 100 through which a light ray is able to penetrate.

The transparent solid element 100 including a fixing surface 101 which is used for fixing to the border 20 and a light-ray exiting surface 102 which is opposite to the fixing surface 101, the transparent solid element 100 further including an inner area which is opposite to the border 20 and an outer area which is opposite to the edge display area of the display screen.

Wherein, a first prism structure 103 is formed at a position corresponding to an inner area of the light-ray exiting surface 102, a light ray exits from the edge display area of the display screen 10 and enters into the outer area of the transparent solid element 100, and a part of the light ray is deflected by the first prism structure 103 of the light-ray exiting surface 102 of the transparent solid element 100 and exits from an inner area of the light-ray exiting surface 102.

In the above configuration, the transparent solid element 100 may be arranged on the border 20. The fixing surface 101 of the transparent solid element 100 is fixed to the border 20. The transparent solid element 100 includes the inner area and the outer area. In other words, a center portion of the transparent solid element 100 is arranged on the border 20, and at least a part of the transparent solid element 100 is arranged in the edge display area that is outside of the border 20. Therefore, the light ray is able to enter into the transparent solid element 100 from the edge display area of the display screen 10. At least a part of the light ray entering into the transparent solid element 100 enters into the first prism structure 103 of the light-ray exiting surface 102, is deflected by the first prism structure 103, and exits from the inner area of the light-ray exiting surface 102 of the transparent solid element 100 at different angles. In other words, the light ray exits from an upper portion of the border 20, such that a viewer is able to see a display image from a position corresponding to the border 20. Therefore, the light ray exiting from the edge display area is deflected, such that the viewer is able to see a canceled or weakened effect (the border 20 of the splicing screen is narrowed) of the border 20 from a front area of the splicing screen. According to the embodiment of the present invention, the transparent solid element 100 is only arranged at a position corresponding to the border 20 of the splicing screen and a part of the edge display area without covering the entire of the display screen 10. Therefore, a cost can be reduced.

Hereafter, a preferred embodiment of the splicing-screen weakening structure according to the present invention will be described.

According to the present embodiment, preferably, as shown in FIGS. 1 to 3, the first prism structure 103 includes a plurality of first grooves.

In the above configuration, the first prism structure 103 is a folded structure formed by a plurality of first grooves, and is also a polyhedron prism structure. In other words, the first prism structure 103 includes a plurality of light-ray deflecting surfaces which deflects the light ray. Comparing with the light-ray exiting surface 102 which includes one groove, a depth of each groove of the first prism structure 103 can be smaller than that of the one groove of the light-ray exiting surface 102. Therefore, a thickness of the transparent solid element 100 can be smaller, and it is easy to thin the splicing screen. Since the first prism structure 103 includes a plurality of light-ray deflecting surfaces, the first prism structure 103 deflects the light ray and exits the light ray at different visual angles. Comparing with the light-ray exiting surface 102 which includes the one groove, the viewer is able to see the light-ray at different angles, the weakening effect of the splicing-screen border can be achieved at different angles, that is, a viewing-angle range of the weakened effect is increased.

According to the present embodiment, preferably, the first grooves include at least one side surface having a curved-surface structure.

In the above configuration, each of the first grooves of the first prism structure 103 has at least one side surface which is a curved surface. When the light ray of the edge display area of the display screen 10 passes through the curved surface, the light ray can be scattered. Therefore, the first prism structure 103 further exits the light ray at different angles, and the viewing-angle range of the weakened effect is increased.

Hereafter, a preferable configuration of the first grooves will be described. As shown in FIGS. 1 to 3, the first grooves include a center groove 1031, and outer grooves 1032 which are symmetrically arranged with respect to the center groove 1031. The center groove 1031 has two side surfaces which are symmetrically with respect to a center line of the center groove 1031, and the side surfaces are curved surfaces. Each outer groove 1031 has a first side surface which is flat surface and a second side surface which is farther from the center groove 1031 than the first side surface and is a curved surface.

As shown in FIGS. 1 to 3, in the above configuration, since the center groove 1031 has two side surfaces which are symmetrically with respect to a center line of the center groove 1031 and are curved surfaces, and the outer groove 1032 has the first side surface which is flat surface and the second side surface which is a curved surface, the first prism structure 103 can evenly exit the light ray. Therefore, an optimal weaken effect can be obtained. In addition, according to the above configuration, the curved surface can be an arc curved surface, a quadratic-curve-surface, or a freeform surface.

Further, in practical applications, the first grooves of the first prism structure 103 may have other inclined angles or other curved surfaces according to actual requests. For example, each first groove may have side surfaces which are inclined flat surfaces.

According to the present embodiment, preferably, as shown in FIG. 3, the transparent solid element 100 further includes side walls formed between the fixing surface 101 and the light-ray exiting surface 102. Second prism structures 104 are formed on the side walls to prevent the light ray from generating a total reflection on the side walls.

As shown in FIG. 2, a part of the light ray exiting from the edge display area of the display screen 10 enters into the side walls of the transparent solid element 100. When the side walls of the transparent solid element 100 are flat surfaces, some of the light ray entering into the side walls has a relatively large incidence angle, and the total reflection is generated. Therefore, the viewing-angle range of the weakened effect is affected, and a total-reflection light ray is generated between the display screens 10. As shown in FIG. 3, according to the above configuration, The second prism structures 104 are formed on the side walls of the transparent solid element 100, so the total reflection of the light ray entering into the said wall is prevented, the viewing-angle range of the weakened effect is further increased, and a total-reflection light ray between the display screens 10 is canceled.

Hereafter, a preferable configuration of the second prism structure 104 will be described. As shown in FIG. 3, according to the present embodiment, preferably, the second prism structure 104 includes a plurality of second grooves which are repeatedly arranged. Each second groove includes a first groove surface 1041 which is close to the light-ray exiting surface 102 and a second groove surface 1042 which is close to the fixing surface 101. The first groove surface 1041 has a flat shape and is parallel to a display surface of the display screen 10.

According to the above configuration, as shown in FIGS. 2 and 3, the first groove surface 1041 of the second prism structure 104 is a horizontal flat surface that is parallel to the display surface of the display screen 10. Comparing with the first groove surface 1041 that is a inclined surface, the horizontal flat surface cancels the total reflection of the light ray entering into the first groove surface 1041. Further, the light ray exiting from the first groove surface 1041 is able to have a larger exiting angle, and the viewing-angle range of the weakened effect is further increased. It is understandable that the second prism structure 104 is not limited to the above configuration in practical applications.

According to the present embodiment, further preferably, as shown in FIG. 3, the second groove surface 1042 also has a flat shape. An angle α between the first groove surface 1041 and the second groove surface 1042 is about 45 degrees. It is understandable that the angle α can be adjusted according to actual requests in practical applications.

According to the present embodiment, fixing glue is able to be provided between the fixing surface 101 and the border 20 to fix the fixing surface 101 to the border 20. The fixing glue may be a glue or an adhesive tape which has a relative high adhesive strength. The adhesive tape is necessary to readily adhere and remove. Further preferably, a supporting structure 105 that is transparent is arranged at an edge position of the outer area of the fixing surface 101. According to the above configuration, the supporting structure 105 prevents a prism body from moving after being fixed, and improves a resistance torque of the transparent solid element 100, a pressure resistance of the transparent solid element 100, and a stability of the transparent solid element 100.

As shown in FIGS. 1 to 3, according to the present embodiment, preferably, the supporting structure 105 is made of a transparent material. Further preferably, the supporting structure 105 is directly formed on the fixing surface 101 of the transparent solid element 100.

The transparent solid element 100 may be a one-piece-structure made of a resin having a high transmission rate. For example, the transparent solid element 100 may be made of polymethyl methacrylate (PMMA), polycarbonates (PC), or polyethylene terephthalate (PET). Alternatively, the transparent solid element 100 may be a one-piece-structure made of an optical glass. For example, the transparent solid element 100 may be made of a crown glass or a flint glass.

According to the splicing-screen border weakening structure of the present invention, heights of the first prism structure 103, the second prism structure 104, and the distance between the fixing surface 101 and the light-ray exiting surface 102 of the transparent solid element 100, and the distance between the fixing surface 101 and the display screen 10 can be adjusted according to actual requests so as to obtain a better weaken effect.

It is another solid element of the present invention to provide a splicing screen which has the above splicing-screen border weakening structure.

The above described preferred embodiment of the present invention, it should be noted that those of ordinary skill in the art, in the present invention without departing from the principles, further improvements and modifications may be made, such modifications and retouch also considered the scope of the present invention.

What is claimed is:

1. A splicing-screen border weakening structure arranged at a border between two display screens which are adjacent to each other, the display screen including a center display area, an edge display area, and a border area, the splicing-screen border weakening structure comprising:

a transparent solid element through which a light ray is able to penetrate, the transparent solid element including a fixing surface which is used for fixing to the border and a light-ray exiting surface which is opposite to the fixing surface, the transparent solid element further including an inner area which is opposite to the border and an outer area which is opposite to the edge display area of the display screen, wherein, a first prism structure is at least arranged at a position corresponding to the inner area of the light-ray exiting surface, a light ray exits from the edge display area of the display screen and enters into the outer area of the transparent solid element, and a part of the light ray is deflected by the first prism structure of the light-ray exiting surface of the transparent solid element and exits from the inner area of the light-ray exiting surface.

2. The splicing-screen border weakening structure according to claim 1, wherein the first prism structure comprises a plurality of first grooves.

3. The splicing-screen border weakening structure according to claim 2, wherein
each of the first grooves comprises at least one side surface having a curved-surface structure.

4. The splicing-screen border weakening structure according to claim 3, wherein
the first grooves comprise a center groove, and outer grooves which are symmetrically arranged with respect to the center groove, the center groove has two side surfaces which are symmetrically arranged with respect to a center line of the center groove, and the side surfaces are curved surfaces, each outer groove has a first side surface which is flat surface and a second side surface which is farther from the center groove than the first side surface and is a curved surface.

5. The splicing-screen border weakening structure according to claim 1, wherein
the transparent solid element further comprises side walls formed between the fixing surface and the light-ray exiting surface, and a second prism structure is formed on the side walls to prevent the light ray from generating a total reflection on the side walls.

6. The splicing-screen border weakening structure according to claim 5, wherein
the second prism structure comprises a plurality of second grooves which are repeatedly arranged, each of the second grooves comprises a first groove surface which is close to the light-ray exiting surface and a second groove surface which is close to the fixing surface, and the first groove surface has a flat shape and is parallel to a display surface of the display screen.

7. The splicing-screen border weakening structure according to claim 6, wherein
the second groove surface has a flat shape, and an angle between the first groove surface and the second groove surface is 45 degrees.

8. The splicing-screen border weakening structure according to claim 1, wherein
a supporting structure that is transparent is arranged at an edge position of the outer area of the fixing surface.

9. The splicing-screen border weakening structure according to claim 1, wherein
the transparent solid element is a one-piece-structure made of a resin having a high transmission rate or made of an optical glass.

10. A splicing screen, comprising the splicing-screen border weakening structure according to claim 1.

* * * * *